United States Patent [19]
Jennings et al.

[11] Patent Number: 5,197,377
[45] Date of Patent: Mar. 30, 1993

[54] APPARATUS FOR TWO-SIDED COOKING

[75] Inventors: Ralph E. Jennings, Stanton; Robert R. Rosas, Long Beach; Manuel M. Ezpeleta, Los Angeles, all of Calif.

[73] Assignee: Premark FEG Corporation, Wilmington, Del.

[21] Appl. No.: 638,584

[22] Filed: Jan. 8, 1991

[51] Int. Cl.$^5$ .............................................. A47J 37/06
[52] U.S. Cl. ........................................ 99/347; 99/331; 99/378; 99/379; 99/390
[58] Field of Search ................ 99/377, 379, 372, 349, 99/331, 378, 390; 126/41 R; 248/280.1, 292.1

[56] References Cited

U.S. PATENT DOCUMENTS

| | | | |
|---|---|---|---|
| 992,417 | 5/1911 | Gale | 99/379 |
| 1,244,965 | 10/1917 | Durgarian | 99/349 |
| 4,150,609 | 4/1979 | McClean | 99/372 |
| 4,165,682 | 8/1979 | Weiss | 99/331 |
| 4,483,239 | 11/1984 | Mueller et al. | 99/379 |
| 4,697,504 | 10/1987 | Keating | 99/349 |
| 4,702,159 | 10/1987 | Polster | 99/349 |
| 4,763,571 | 8/1988 | Bergling et al. | 99/349 |
| 4,972,766 | 11/1990 | Anetsberger | 99/349 |
| 4,987,827 | 1/1991 | Marquez | 99/349 |

Primary Examiner—Harvey C. Hornsby
Assistant Examiner—Patrick F. Brinson
Attorney, Agent, or Firm—Russell L. McIlwain

[57] ABSTRACT

Apparatus for two-sided cooking comprises one or more upper housing assemblies each having a pair of spaced bayonette members which are removably insertable in a holster brackett. The bracket is readily attachable to the rear of a conventional cooking grill thus retrofitting the grill conveniently for two-sided cooking. A plurality of lightweight platens are mounted in the upper housing by quick release pins which permit the upper platens to float relative to the housing. Because of the lightweight, multiple and floating nature of the upper platens, the housing can be lowered to the grill surface as to completely enclose the items being cooked, thus containing heat and trapping moisture in the cooked product. In addition, food products having differing thicknesses can be cooked simultaneously without appreciable sticking.

6 Claims, 6 Drawing Sheets

APPARATUS FOR TWO-SIDED COOKING

BACKGROUND OF THE INVENTION

1. Field of the Invention

The present invention relates generally to apparatus for two-sided cooking of food and, more particularly, to an improved upper cooking assembly which can be readily retrofitted to a conventional single-sided cooking grill.

2. Description of the Prior Art

The cooking of food in commercial or institutional establishments typically requires use of a grill. Grills in common use comprise a relatively large cooking surface, or platen, which is heated from beneath by electric heating elements or gas burners. Particularly in fast food establishments where hamburgers, or the like, are the predominant food item, two-sided cooking grills have proved to be quite useful. The two-sided, or clam shell, cooker includes an upper cooking apparatus which may be manually lowered onto or over a lower grill such that a heated platen in the upper cooking assembly contacts the upper surface of the item being cooked. Heat may thereby be applied to both surfaces of the item at the same time, thus offering the advantage of decreasing cooking time significantly. Two-sided cookers are particularly advantageous in the cooking of hamburgers, or the like, because the simultaneous cooking of both sides of the patty prevents undersirable curling or distortion of the patty due to uneven shrinkage, as occurs in a single-sided cooking process.

Two-sided cookers of conventional design are not without disadvantages. One shortcoming resides in the construction of the upper cooking assembly. In particular, it is common for the upper assembly to include a single platen which is formed with an internal heating element. In such an arrangement, the platen can be so heavy that it would excessively flatten or smash the item being cooked. Accordingly, prior art devices exist having adjustable spacer means for supporting the upper platen at a predetermined distance above the cooking surface of the lower grill. The spacer means may be made adjustable by various mechanisms, as taught by Harter, et al., U.S. Pat. No. 4,601,237 or Sabin, U.S. Pat. No. 4,729,296. However, these arrangements can be complex, adding to the cost of the apparatus, and the mechanisms can be difficult to maintain in clean condition when in use. Another disadvantage of the single upper platen devices is that food items tend to stick to the platen because of platen weight on the item. Various approaches exist for attempting to minimize the sticking problem. For example, Scanlon, U.S. Pat. No. 4,700,619 teaches a separate cooking plate which is removably attached to the upper platen and is coated with a layer of non-stick synthetic material. Also, Adamson, et al., U.S. Pat. No. Re. 32,994 discloses low-friction sheet means juxtaposed to the surface of the upper platen. While these arrangements address the sticking problem, in practice they are not convenient solutions. The low friction material of Scanlon wears away and must be renewed periodically, contributing to inconvenience and expense in the maintenance of the cooker. Moreover, the Adamson, et al, approach, as a practical matter, is also inconvenient and expensive.

Yet another disadvantage of conventional two-sided cookers is the hinge and counterbalance construction used to permit raising of the upper cooking assembly. Bergling, et al., U.S. Pat. No. 4,763,571, for example, teaches an arrangement involving counterbalance weights extending off the rear of the grill. Such a construction adds bulk to the grill making the grill undersirable for use in confined spaces. Other mechanisms comprising pulleys and linkages are costly to manufacture. None of the upper cooking assemblies now used in two-sided cookers lends itself to convenient retrofitting on a single-sided grill. Thus, a need exists for such a retrofitable assembly which is readily manufacturable and which overcomes the aforementioned disadvantages of current apparatus.

SUMMARY OF THE INVENTION

The present invention overcomes the disadvantages of the prior art in the provision of an upper housing having multiple lightweight cooking platens supported therein, and a heating element disposed between the platens and housing. The platens are connected to the housing in floating fashion by quick release pins permitting them to be easily removed for cleaning or replacement. The housing is hingedly connected to a pair of spaced bayonette members which, in turn, are insertable into corresponding holster slots of a bracket. Simple spring elements are connected between the bayonette members and the housing to bias the housing in its upward position. The bracket may readily be bolted to a plate on the rear of grill of virtually any conventional design. Thus, the upper housing and platen assembly may be readily retrofitted to grills in use in the field without time consuming and costly modification of the grills. Because of the lightweight, multiple and floating nature of the upper platens, the housing can be lowered to the grill surface as to completely enclose the items being cooked, thus containing heat and trapping moisture in the cooked product. The provision of multiple lightweight platens permits a variety of food products having different thicknesses to be cooked simultaneously without appreciable sticking of the food item.

BRIEF DESCRIPTION OF THE DRAWINGS

The features and advantages of the invention will become apparent from the following detailed description taken in connection with the accompanying drawings wherein.

DETAILED DESCRIPTION OF THE PREFERRED EMBODIMENTS

Figure 1:
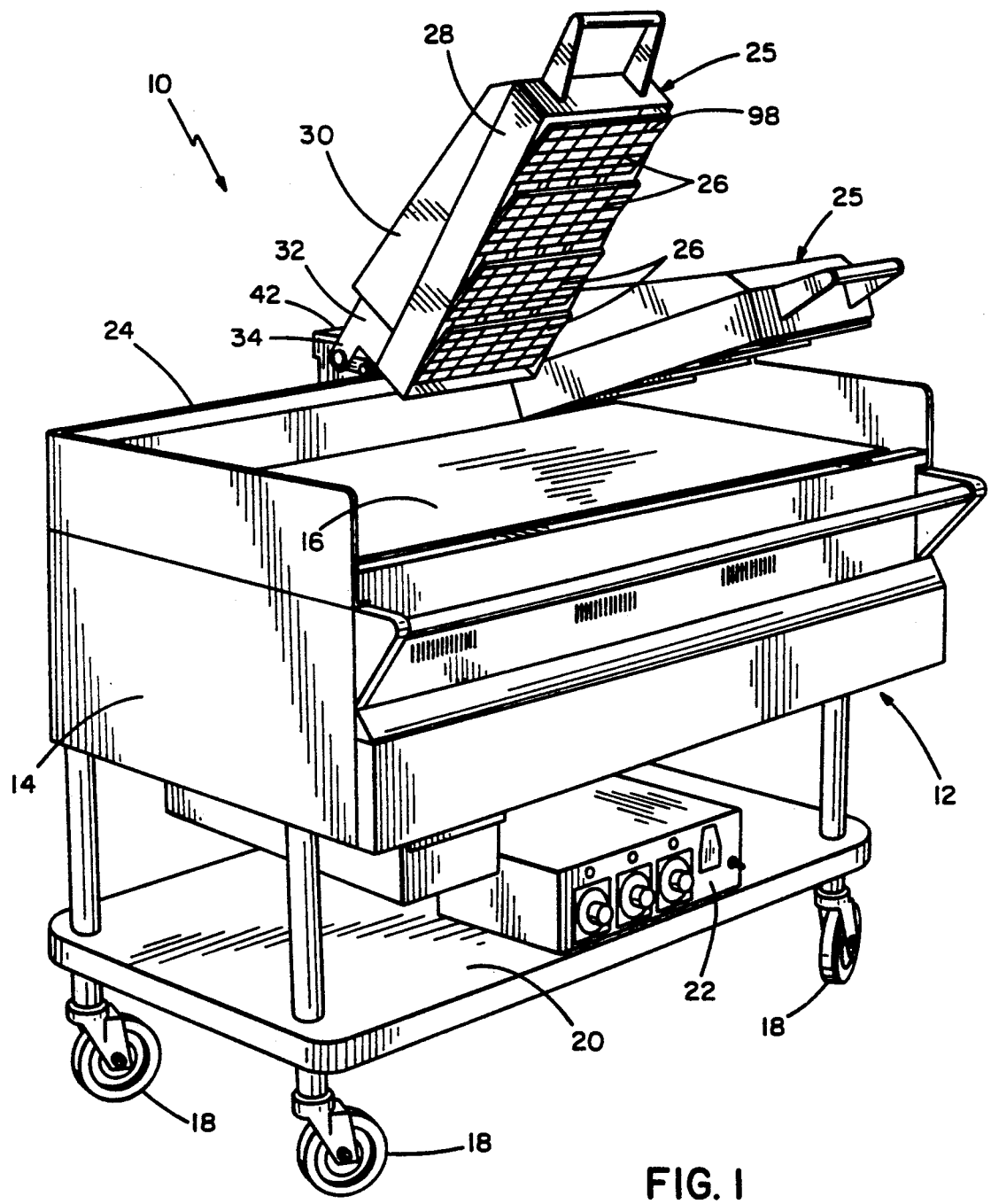
FIG. 1 is a perspective view of a two-sided cooker constructed in accordance with the invention.

Referring now to the drawings, and initially to FIG. 1, a two-sided cooker, designated generally by the reference numeral 10, includes a conventional cooking grill 12 comprising a housing 14 which supports a cooking platen 16. The grill 12 is supported on suitable casters 18 and further includes a lower shelf 20 on which a power controller 22 may be placed. In accordance with the invention, extending over rear wall 24 of the grill housing 14 and mounted to the grill 12 in a manner which will be described in detail, hereinafter, are a pair of upper cooking assemblies 25.

Each upper cooking assembly 25 includes a plurality of platens 26 mounted in floating fashion within a platen housing 28. A cover 30 is removably attached to the platen housing 28. Fastened to the upper wall of the platen housing 28 as by screws, or the like, is a support bracket 32. Extending rearwardly of the assembly 25, the support bracket 32 is configured to define a pair of ears 34.

Figure 2:
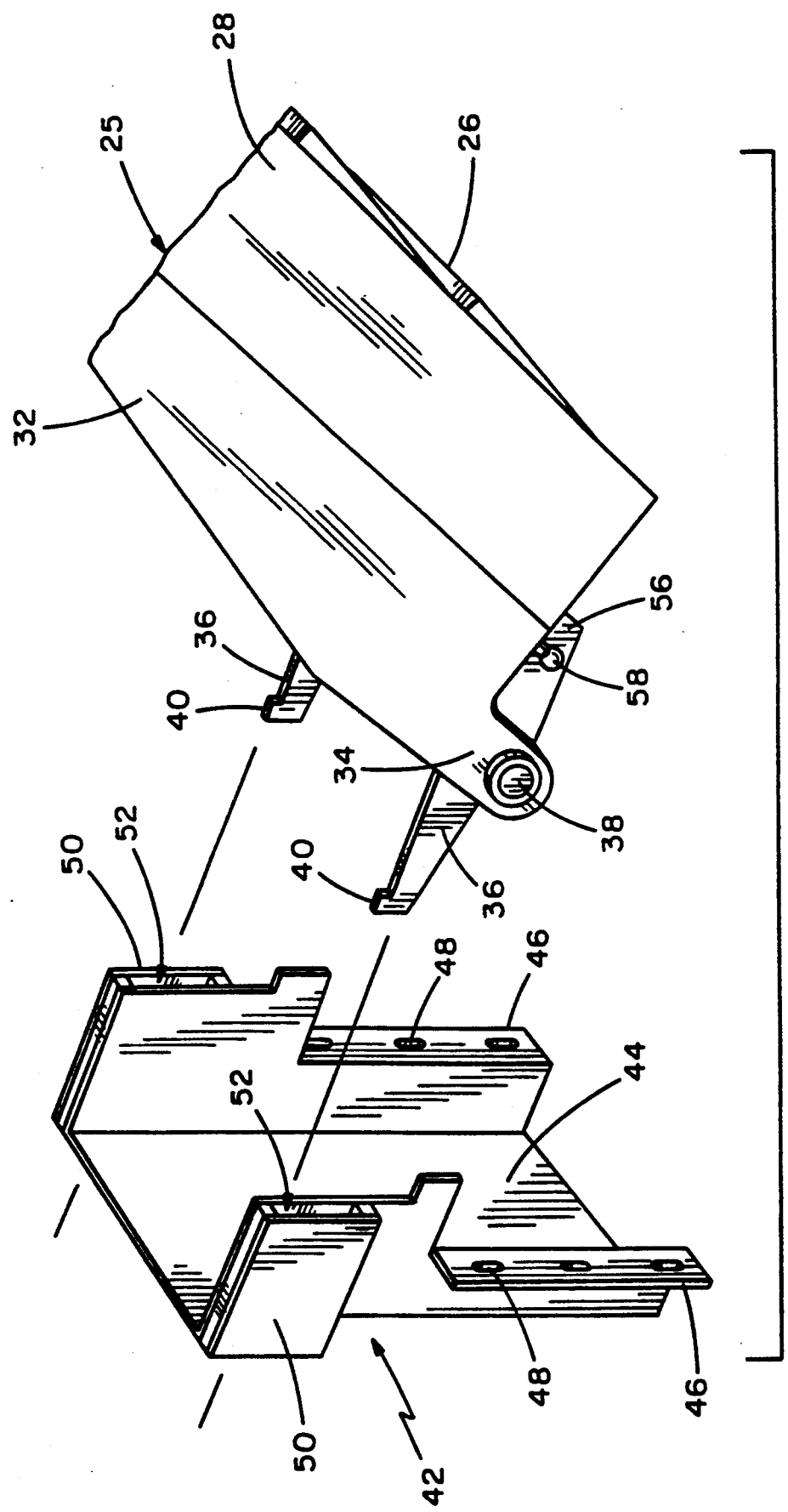
FIG. 2 is an exploded perspective view illustrating the mounting configuration of the upper cooking assembly shown in FIG. 1.

Turning now to FIG. 2, the mounting structure of the upper cooking assembly 25 can be seen to include a pair of bayonette arms 36 supported for hinged movement on a cross shaft 38 extending between the ears 34 of the support bracket 32. Each arm 36 is provided with an upwardly projecting tang 40 at the distal end thereof. For mounting an upper cooking assembly 25 to the grill 12, there is provided a holster bracket 42 comprising a U-shaped member 44 preferably stamped and formed from suitable sheet steel. Member 44 is provided with a pair of flanges 46 having suitable apertures 48 therein for permitting bolting of the holster brackets 42 to the grill 12. A pair of plates 50 are spaced from and welded to the sides of the U-shaped member 44 defining slots 52 for telescopingly receiving the bayonette arms 36 of the upper cooking assembly 25.

Figure 3:
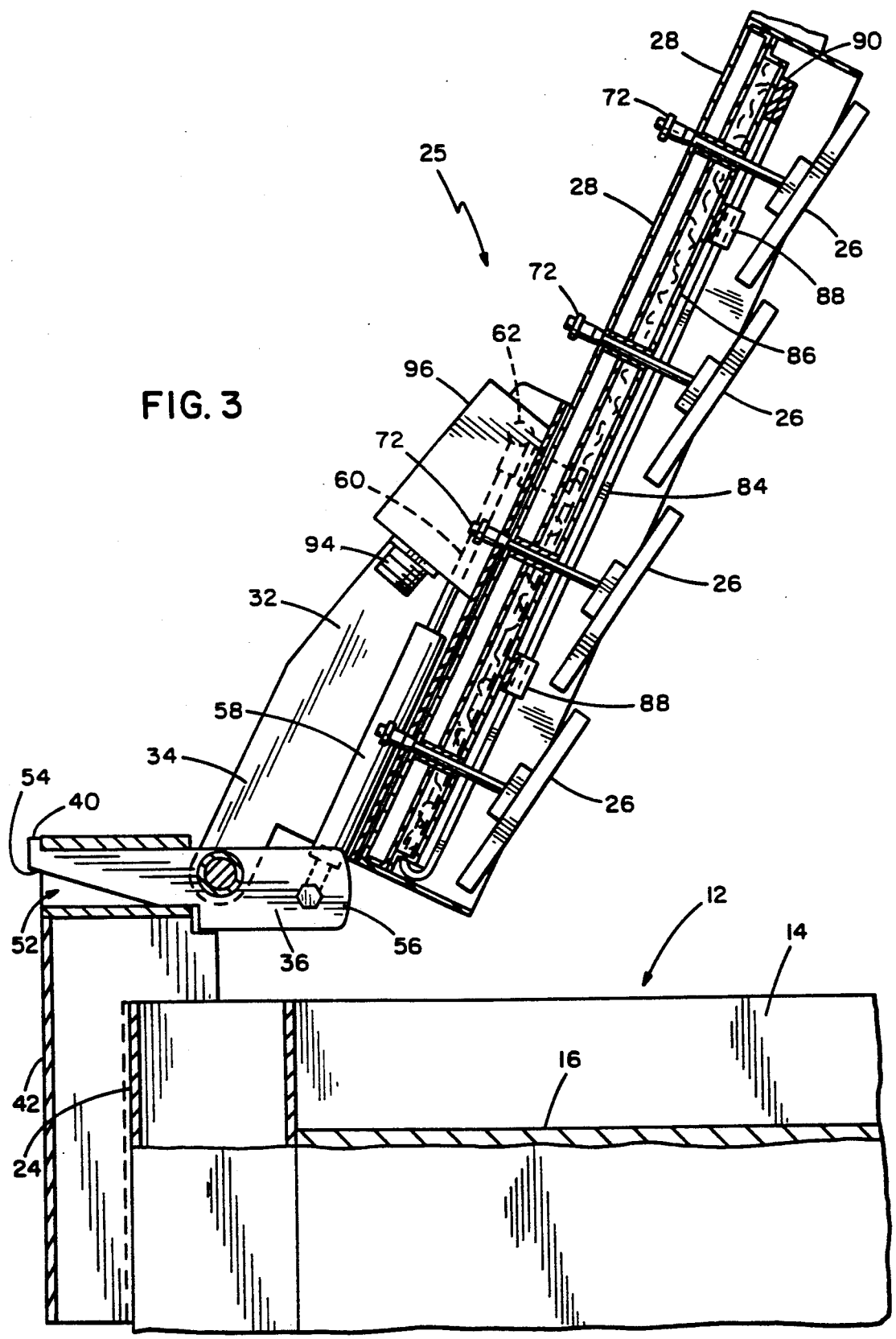
FIG. 3 is a partial cross-sectional view of the cooker illustrated in FIG. 1.

As best seen in FIG. 3, the bayonette arms 36 are received within the slots 52 of the holster bracket 42 such that tangs 40 project from the rear of the slots 52 and prevent lateral movement of the bayonette arms 36 relative to the holster bracket 42 when the cooking assembly 25 is in normal use. A tapered edge 54 of the bayonette arms 36 permits the arms 36 to be cocked within the slots 52 allowing tangs 40 to be withdrawn through the slots 52 when it is desired to remove the cooking assembly 25 from its mounted configuration. In order to counter balance the cooking assembly 25 so that it may be hinged up and down with relative ease, the bayonette arms 36 are provided with forward extension portions 56 to which are bolted a pair of spring cylinder assemblies 58. Rods 60 of the spring cylinder assemblies 58 are attached by swivel joints 62 to forward ends of the support bracket 32, and are normally biased outwardly such that the weight of the cooking assembly 25 is effectively counterbalanced.

Figure 4:
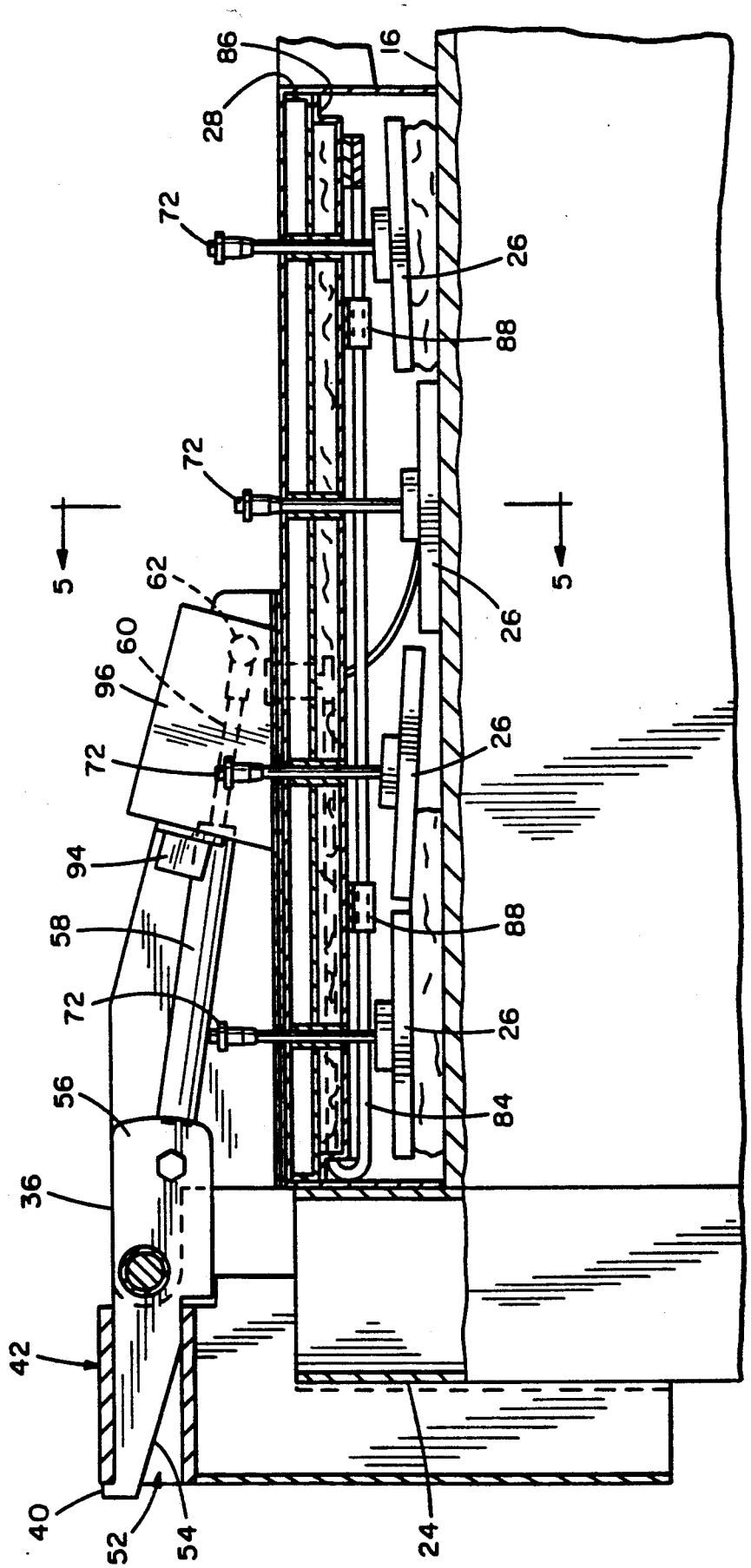
FIG. 4 is a partial cross-sectional view similar to FIG. 3 but with the upper platen assembly shown in the down position for cooking.
Figure 5:
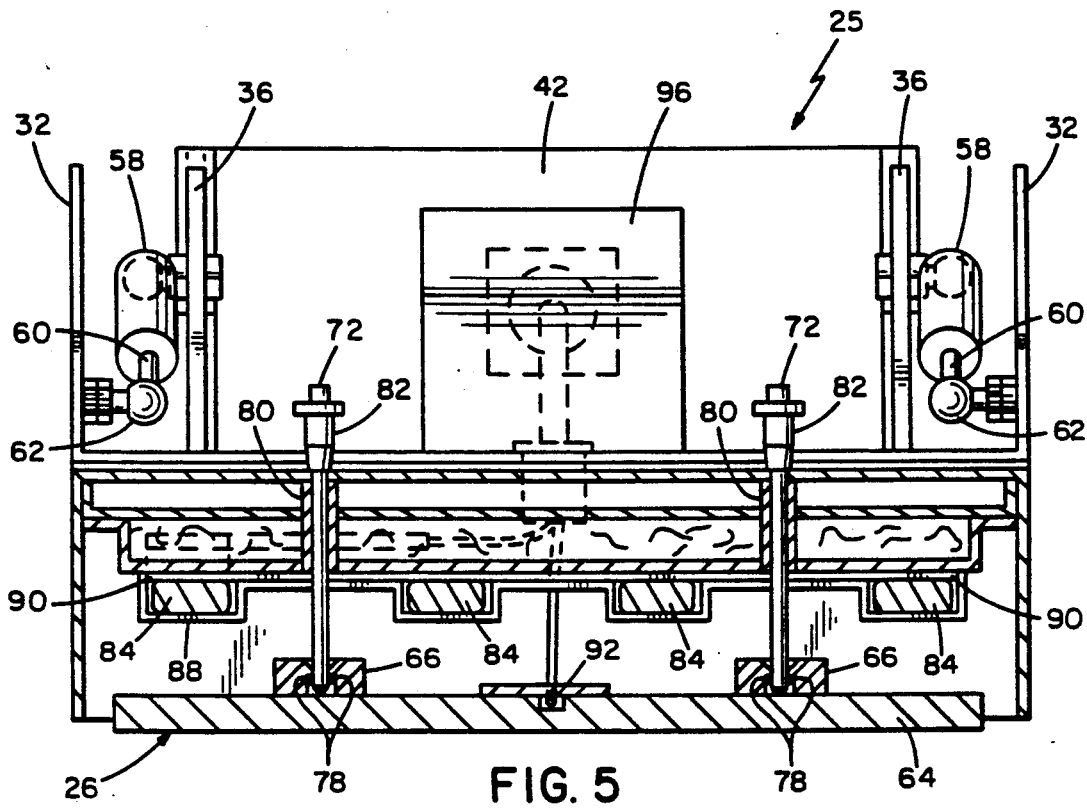
FIG. 5 is a cross-sectional view taken substantially along the lines 5—5 of FIG. 4.
Figure 6:
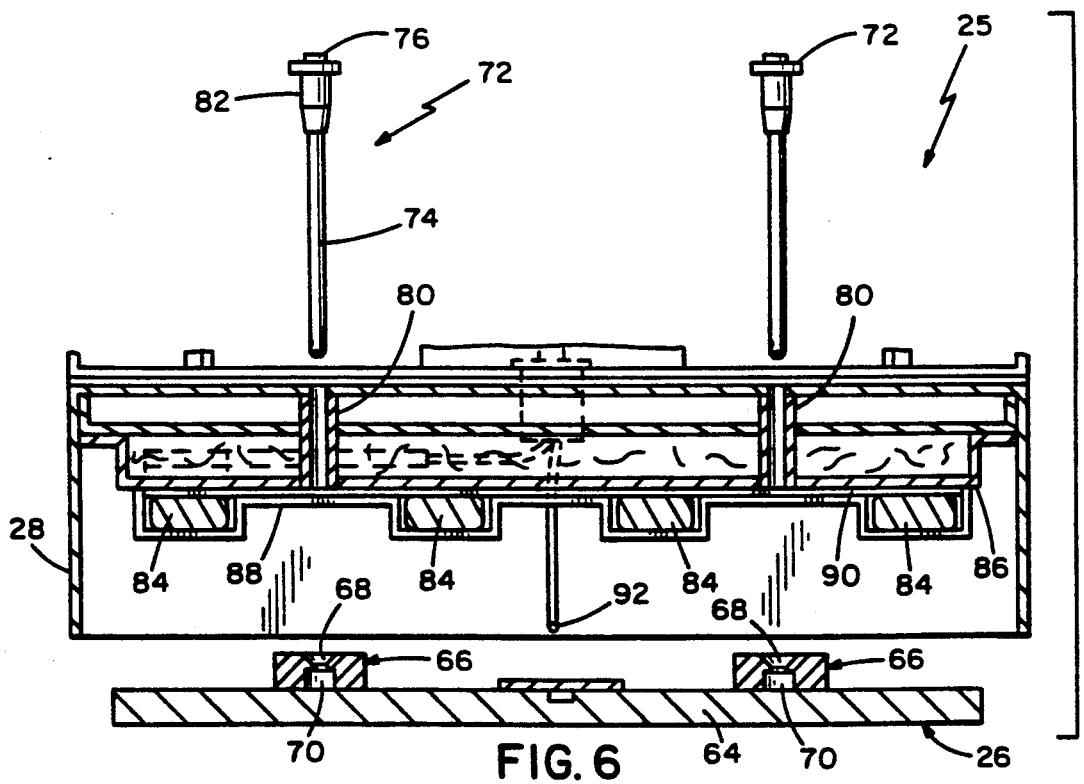
FIG. 6 is a partial cross-sectional view similar to FIG. 5 but with the cooking platens shown detached from the cooking assembly.

Turning now to FIGS. 4, 5 and 6, each upper platen 26 can be seen to comprise a thin, generally rectangular plate 64 having a pair of spaced blocks 66 fastened to the upper surface thereof. The plates 64 are preferably on the order of three-eights inch thick and are made from suitable aluminum alloy so as to be lightweight. As best seen in FIG. 6, each block 66 is provided with a tapered countersink-like bore 68 opening to a pocket 70. To mount the platens 26 to the cooking assembly 25 there are provided quick release pins 72. Each release pin 72 includes a tube portion 74 containing an axial spring biased plunger 76. The plunger acts to selectively extend and withdraw a pair of balls 78 retained in apertures of the tube end 74. Thus, when the plunger 76 is depressed, the balls 78 withdraw into the tube 74 and the pin 72 may be inserted into the pocket 70 of the platen block 66. The pins 72 extend through guides 80 fixed within the housing 28 of the cooking assembly 25 and have enlarged upper portions 82 such that they abut the housing 28 when the platens 26 are in their lowermost positions, thus retaining the platens 26 in floating fashion within the housing 28. The pins 72 are sufficiently long that the platens 26 may protrude slightly below the lower edge of the housing 28.

Figure 7:
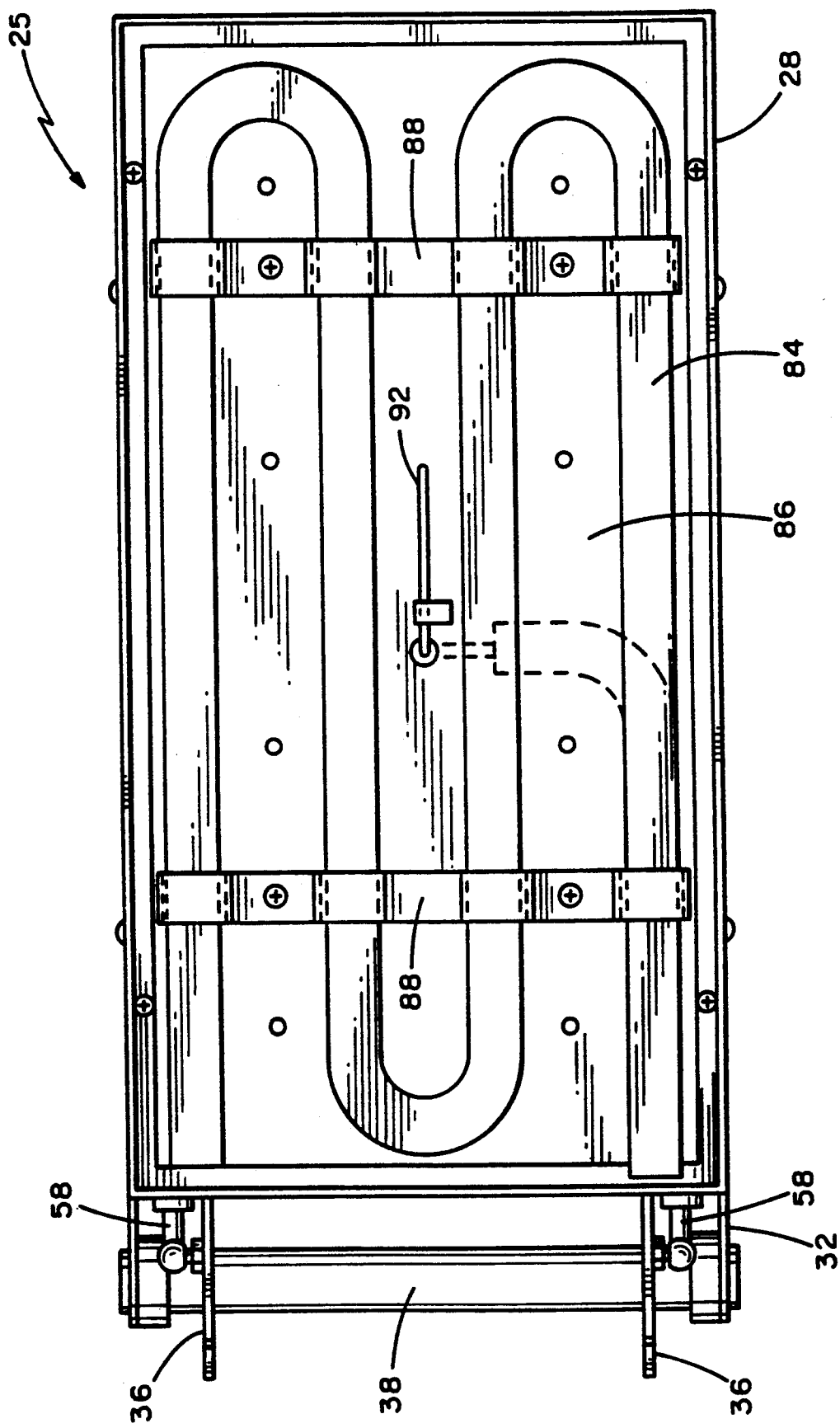
FIG. 7 is a bottom plan view of the upper cooking assembly with the platens removed.

With reference now to FIGS. 5, 6 and 7, heating of the platens 26 is accomplished by a conventional heating element 84 arranged in a serpentine pattern and fixed to wall 86 within the housing 28 by a pair of brackets 88. Interposed between the heating element 84 and wall 86 is a layer of suitable insulation 90. Wall 86 is sufficiently spaced from the lower edge of the housing 28 that the heating element 84 does not contact the platens 26 when the assembly 25 is in normal operation. Heating of the platens 26 is performed by radiation rather than conventional conduction. Thus, the platens 26 are afforded maximum capability to freely float relative to the housing 28 and the food. Extending through the wall 86 in a centrally disposed location is a temperature probe 92 for sensing the temperature of the platen 26 when the assembly 25 is in operation. As best seen in FIG. 4, to energize the heating element 84, electrical connections are made through a military-type connector 94 fitted to a connector housing 96 which, in turn, is attached onto the surface of the support bracket 32.

It can be appreciated that the upper cooking assembly 25 of the instant invention may be readily retrofitted to virtually any type of conventional single-sided cooking grill. One or more assemblies 25 may be mounted to the grill by bolting a plate (not shown) to the back of the grill 12 then bolting the holster brackets 42 to the plate. The assemblies 25 may be easily attached to the holster brackets 42 by simply sliding the bayonette arms into their respective slots 52. Because of the quick connect nature of the connector 94, electrical wiring of the assembly 25 may be readily accomplished and the conversion to two-sided cooking can be quickly completed with minimal down time of the cooker 10. The mounting arrangement of the assemblies 25 further allows for convenient removal and replacement of an assembly 25 for maintenance or cleaning.

The cooking performance, cleanability and maintainability of the assembly 25 is further apparent from the novel construction of platen arrangement of the assembly 25. Each platen 26 is a thin, lightweight member which floats relative to the platen 16 of the grill 12. The platens 26 not only move vertically, but they also can rotate relative to their mounting pins 72, as shown in FIGS. 3 and 4, due to the construction of the bores 68 provided in the platen blocks 66. This rotational capability is highly advantageous in allowing the platens 26 to self-adjust to the surface irregularities of the food items being cooked. As seen in FIG. 4, the fact that multiple platens 26 are provided having both floating and rotational characteristics permits foods of varying thicknesses and shapes to be cooked without deformation of the food items, all while the lower edge of the housing 28 is essentially resting on the lower platen 16 of the grill 12. Thus, cooking juices may be trapped within the housing 28 enhancing the quality of the cooked product. To impart a grilled look to the product, the platens may be provided with a grid of grooves 98, as best shown in FIG. 1.

It should further be appreciated that the problem of sticking of food to the upper platen is minimized in the instant invention. The provision of multiple, thin, lightweight platens 26 which float and have no heating element carried by them allows the platens 26 to cook without appreciable food sticking. Moreover, the platens 26 are easily removed for cleaning by simply sliding off the cover 30 and releasing the pins 72.

While the present invention has been described in connection with particular embodiments thereof, it will be understood by those skilled in the art that many changes may be made without departing from the true spirit and scope of the present invention.

We claim:

1. Apparatus for converting a single-sided cooking grill having an upwardly facing cooking surface to a two sided cooker comprising:
   a housing;
   a platen mounted in said housing;
   an electric heating element for heating said platen;
   a hinge provided on said housing;
   a pair of spaced horizontally extending bayonette members extending from said hinge, each of said bayonette members tapering to a smaller vertical dimension away from said hinge;
   a tang projecting upwardly at the distal end of each bayonette member;
   a bracket having a pair of spaced through holster slots for receiving said bayonetee members and defining a pair of rear edges, said bracket being connectible to the rear of said grill with said holster slots extending generally horizontally and parallel to the surface of said grill;
   whereby said horizontally extending bayonette members may be selectively inserted into and removed from said holster slots and cocked to a seated position wherein said tangs engage the rear edges of said holster slots such that withdrawal of said bayonette members from said slots is prevented.

2. The cooking apparatus of claim 1 wherein said housing is provided with apertures and said upper platen is mounted to said housing by pins extending through said apertures.

3. The cooking apparatus of claim 2 wherein said pins are provided with quick release means for releasably mounting said upper platen.

4. The cooling apparatus of claim 1 wherein a pair of spring members are connected between the bayonette members and the housing for biasing the housing to an upper position when the housing is raised from said grill.

5. The cooking apparatus of claim 1 wherein the upper platen is thin in cross-section and is made from aluminum alloy.

6. The cooking apparatus of claim 1 wherein the lower surface of the upper platen is provided with a multiplicity of grooves.

* * * * *